United States Patent [11] 3,607,397

[72] Inventor Larry H. Watters
 Akron, Ohio
[21] Appl. No. 827,885
[22] Filed May 26, 1969
[45] Patented Sept. 21, 1971
[73] Assignee The Goodyear Tire & Rubber Company
 Akron, Ohio
 Continuation-in-part of application Ser. No.
 673,964, Oct. 9, 1967, now Patent No.
 3,475,217.

[54] METHOD OF RETARDING FOULING OF SUBSTRATE SURFACES
 12 Claims, No Drawings
[52] U.S. Cl. .................................................. 134/3,
 134/28, 134/41, 252/142, 264/39
[51] Int. Cl. ...................................................... B08b 3/00,
 C23g 1/02
[50] Field of Search ........................................... 134/3, 28,
 41; 260/540, 541, 543; 264/39, 130; 252/142, 193

[56] References Cited
 UNITED STATES PATENTS
1,952,417 3/1934 Chandler ...................... 134/3
2,417,468 3/1947 Canziani et al. ............... 134/28
2,862,239 12/1958 Pollard et al. .................. 264/39
3,369,935 2/1968 Booth et al. ................... 134/28 X Primary Examiner—Morris O. Wolk
Assistant Examiner—Joseph T. Zatarga
Attorneys—F. W. Brunner and Henry C. Young ABSTRACT: A method of retarding the fouling of a substrate surface where the fouling is caused by exposing the said surface to amine compounds in the presence of water and carbon dioxide which comprises contacting the said surface with a mixture of a liquid chloro-substituted olefin and the said amine compound and subsequently treating the surface with an organic acid selected from at least one of the group consisting of formic acid, acetic acid and propionic acid and drying the said substrate surface. The method is particularly useful in restoring the ability of mold surfaces to release molded articles.

METHOD OF RETARDING FOULING OF SUBSTRATE SURFACES

This application is a continuation-in-part of Ser. No. 673,964, filed Oct. 9, 1967, now Pat. No. 3,475,217 dated Oct. 28, 1969. This invention relates to a method of retarding the modification or fouling of a substrate, particularly where the modification or fouling of the substrate is caused by its exposure to compounds containing primary and secondary amino groups.

Therefore, it is an object of this invention to provide a method of retarding the fouling of such substrate surfaces.

In accordance with this invention it has been found that a method of retarding the fouling of a substrate surface where the substrate surface is exposed to or contacted with at least one of the amino compounds consisting of amino compounds having primary amino groups, secondary amino groups and primary and secondary amino groups comprises contacting the substrate surface and any such deposits thereon to a mixture of a liquid chloro-substituted olefin and at least one of the said amino compounds and subsequently treating by contacting the said substrate surface with at least one organic acid selected from formic acid, acetic acid and propionic acid.

Various materials can be molded on substrates to form molded articles. However, it is known that various materials when mold-on a substrate can modify or foul the surface of the substrate to inhibit its ability to release molded articles. For example, when polyurethane reaction mixtures prepared from reactive hydrogen-containing polymeric materials, organic polyisocyanates, and polyamine compounds are cast on a substrate surface and cured to form molded articles, the substrate surface can become modified or fouled so that its ability to release the molded articles is inhibited and the surface definition of the mold is reduced. (The term "surface definition" refers to the distinctness and sharpness of an outline of a surface). Thus, in a molding operation, as successive molded articles are formed from the same mold, the mold surface is progressively modified or fouled and subsequent successive molded articles are more difficult to release from the mold surface, and the mold surface imparts progressively inferior decorative definitions to the surface of the resulting molded articles. As the mold surface becomes progressively modified or fouled, eventually a molded article becomes sufficiently adhered to the mold surface that it cannot be removed from the mold without destroying a portion of the mold or molded article.

It is believed that such substrate surfaces have been fouled when the substrate surface was exposed to compounds containing primary and secondary amino groups.

It is also believed that the substrate surfaces are particularly fouled when exposed to the compounds containing the amino groups in the presence of atmospheric water and carbon dioxide. The said compounds having primary and secondary amino groups are generally characterized by the test which comprises forming one liter of a solution containing from about 10 to about 20 parts by weight of the compound per 100 parts by weight of methyl ethyl ketone, aging the solution for 8 hours at 25° C., warming the solution to 40° C. and passing gaseous carbon dioxide at about 25° C. through the solution at a rate of about one gaseous liter per minute to form a turbidity in the solution with 60 minutes.

Representative of the various compounds having primary and secondary amino groups are aliphatic and aromatic amines and diamines having primary amino groups, secondary amino groups and primary and secondary amino groups, and particularly compounds referred to in this specification as substituted methyl amine compounds. Representative of the substituted methyl amine compounds are those having the structure of the formula (1);

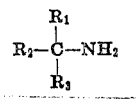

where $R_1$, $R_2$ and $R_3$ are individually selected from the group consisting of (a) hydrogen radicals, alkyl, cycloalkyl, aryl, alkaryl, and aralkyl radicals. Representative of such radicals are alkyl radicals having from one to forty carbon atoms such as methyl, ethyl, propyl, isopropyl, butyl, isobutyl, amyl, isoamyl, hexyl, isohexyl, heptyl, octyl, duodecyl, and tetracontyl radicals; cycloalkyl radicals such as cyclobutane, cyclopentane, cyclohexane, cycloheptane and cyclooctane; aryl radicals such as phenyl and naphthyl radicals; alkaryl radicals such as tolyl and xylyl radicals, and aralkyl radicals such as benzyl radicals; and (b) substituted alkyl, cycloalkyl, aryl, alkaryl, and aralkyl radicals where the substituents are selected from at least one of the group consisting of hydrogen, carbon, oxygen, sulfur, fluorine, chlorine, bromine, iodine, and phosphorous. Representative examples of such substituted radicals are amino radicals, imino radicals, and radicals containing amino groups, imino groups, halo groups, ether groups, and thioether groups.

Particularly representative substituted methyl amines are primary diamines, having their amino groups attached to nonbenzenoid carbon atoms which produce turbidity in the hereinbefore described test.

Further representative examples of said substituted methyl amine compounds are compounds prepared by the method which comprises reacting the substituted methyl amine compound of Formula (1) with an aldehyde or ketone. Various aldehydes can be used, representative of which are formaldehyde, acetaldehyde, propionaldehyde and benzaldehyde. Various ketones can be used representative of which are acetone, methyl ethyl ketone, methyl isobutyl ketone, diisobutyl ketone, methyl n-amyl ketone, methyl-i-amyl ketone and acetophenone. These compounds are generally called aldimines and ketimines.

Representative examples of the various substituted methyl amine compounds are ethylene diamine, hexamethylene diamine and dimethyl hexamethylene diamine; isophorone diamine, 1,4-cyclo-hexane bis methyl amine, 4,4'-diaminodicyclohexyl methane, metaxylene diamine, paraxylene diamine, tetrachloroparaxylene diamine, cyclobutane-1,2 bis methylamine, menthane diamine, imino bis propylamine, bis(amino propyl) piperazine, diethylene triamine, triethylene tetramine, and triethylene pentamine.

Because the substrate surface, when it is so modified or fouled, can have a substantially reduced ability to release molded articles, it is therefore an aspect of this invention to provide a method of retarding or preventing such fouling of the substrate surface where the said substrate surface is exposed to the compounds having primary and secondary amino groups and particularly to the substituted methyl amine compounds.

Although the theory of the substrate surface modification is not thoroughly understood, the fouling is believed to be in the nature of a deposit adhered to the surface of a substrate. The deposit, for example, can be adhered to the surface of an impermeable substrate surface and the deposit can be adhered to the surface and within the pores of a surface of a permeable substrate surface. The problem of the substrate surface fouling is particularly evident when pores of a mold surface become so fouled. Accordingly, when the deposits form within the pores of a mold they can bond to and be reactive with various molding materials, such as a polyurethane reaction mixture when cured, and thus cause the molded articles to adhere to the mold surface. If such a mold surface is a flexible polymeric material, the deposits can continue to form an build up in its pores and cause the surface of the mold to deform, thereby producing an inferior decorative surface definition to the molded article.

Various liquid chloro-substituted olefins or chlorinated paraffins can be used with the amine compounds, particularly as solvents therefor, such as dichloroethylene, trichloroethylene, and 1,1,2,2-tetrachloroethylene; and chloro-substituted saturated hydrocarbon compounds such as methyl chloroform, dichloromethane, 1,2-dichloroethane, trichloroethane, and 1,1,2,2-tetrachloroethane. Trichloroethylene is particularly useful and methylene dichloride is preferred.

Treating the substrate surfaces by this method is found to retard and even to rejuvenate or substantially restore in many instances the ability of the said surface to release molded articles. Apparently treatment of the surface, when it contains the deposit thereon, with the organic acid, can modify it and changes its physical character or the bond of the deposit even within the pores of the substrate. A subsequent treatment of the modified deposit with a lower organic acid, for instance less than 6 carbon atoms, has even surprisingly been found to substantially remove it from the pores of the substrate. Subsequent treatment of the modified deposit with a lower organic acid has surprisingly been found to substantially remove it from the pores of the substrate. Thus, the deposit is removed by first treating the modified substrate with, for example, propionic acid followed by treatment with acetic acid or formic acid. Alternatively, the modified substrate can similarly be treated with acetic acid followed by formic acid.

In the practice of this invention, although the organic acids can be used to treat the substrate or modified substrate with a solvent, it is sometimes desirable to treat the substrate with a mixture of at least one of the organic acids and at least one organic solvent. Suitable organic solvents for this purpose are preferable substantially inert solvents which will penetrate the harmful deposits, representative of which are liquid aliphatic hydrocarbons, liquid chlorinated aliphatic hydrocarbons, liquid aromatic hydrocarbons, liquid chlorinated aromatic hydrocarbons, liquid ketones and their mixtures. By the term "inert" it is meant that the solvents do not chemically react with the substrate and do not dissolve the substrate although it is understood that some solvents may dissolve some of the release agents and parting films, if release agents or parting films are used.

Representative examples of solvents are aliphatic hydrocarbons such as hexane and heptane; halogenated aliphatic hydrocarbons such as tetrachloroethylene, carbon tetrachloride and trichloroethylene; halogenated aromatic hydrocarbons such as chlorobenzene; liquid ketones such as acetone, methyl ethyl ketone and methyl isobutyl ketone; alcohols such as methyl, ethyl, and propyl alcohol; and other organic solvents such as di-methyl-formamide and dimethylsulfoxide.

When the organic acids are used in the absence of solvents or used as a mixture with solvents, it is preferred that the organic acids and the mixtures of organic acids and solvents contain less than about 50 percent by weight of water based on the acid and more preferably that they are essentially water-free although traces of water can be present such as up to about 10 percent by weight of water based on the acid.

Various substrate surfaces and said surfaces having deposits formed thereon have particular utility where the substrate surface is a 90 percent by weight of butadiene, copolymers of butadiene and acrylonitrile, butyl rubber, which is a polymerization product of a major portion of a monoolefin such as isobutylene and a minor portion of a diolefin such as butadiene or isoprene copolymers of ethylene and propylene, and terpolymers of ethylene, propylene and a diene. Representative of the various thermoplastic and thermoset polymers are the polyurethanes, the various epoxide resins and epoxide varnishes, polymeric polyesters and polymers formed by the open ring polymerization of unsaturated alicyclic compounds having from one through three carbon-to-carbon double bonds in the alicyclic ring such as polyoctenamers and polydodecenamers.

Representative of the various release agents for the substrate surfaces are those that do not adhere to the epoxy compounds and polyurethanes and which do not react with polyurethane reactants and epoxy compounds to reduce the flexibility, tear, tensile strength and cold temperature properties of cured polyurethane compositions and epoxy compounds. Any of the many releasing agents or parting agents known to those skilled in the art to be useful in preparing epoxy and polyurethane castings may be used in this invention provided they meet the above requirements.

Some of the many suitable release agents include the polyethylene and polypropylene waxes and emulsions, natural waxes, synthetic waxes, dimethyl silicone fluids, greases and higher polymers, soya bean fatty acid types or vegetable cephalin and lecithin, soaps, fluorocarbons, polyvinyl alcohol and fluorosilicones.

In the practice of this invention, it has been found that even if a substrate is coated with a release agent, when the release agent coating is contacted in the presence of water and carbon dioxide with the substituted methyl amine compounds, the release agent coating can apparently be penetrated and the surface of the substrate can still become modified by the formation of deposits on the surface and within the pores of the substrate. When the surface of a substrate becomes modified with deposits in this manner the surface definition of the substrate is reduced and molded articles are more difficult to release from the substrate. Such a modified substrate surface can be treated by the method of this invention to substantially remove the so-called deposits when formed on the substrate surface or within its pores, following which a release agent coating can be reapplied to the substrate surface.

As hereinbefore described, the deposits formed on and within substrate surfaces prepared from silicone rubbers can be retarded and treated by the method of this invention. Silicone rubbers are a class of materials well known to those skilled in the art as rubbery cured poly(organosiloxanes). The silicone rubbers are particularly suitable substrates for molding epoxy and polyurethane articles because they can form flexible substrates which do not tightly adhere to such articles after the articles are molded. Such substrates may be produced by curing room temperature vulcanizing liquid silicone rubbers or millable gum silicone rubbers well known to those skilled in the art.

Representative of the room temperature vulcanizing liquid silicone rubbery are those described as organopolysiloxane compositions containing silicone-bonded hydroxyl groups which can be cured by metal salts of organic carboxylic acids, by quaternary ammonium compounds or by epoxide containing compounds in the presence of primary, secondary or tertiary amines, and the various heavy metal salts of carboxylic acids derived from tin, iron, and platinum, including dibutyl tin diacetate, dibutyl tin dilaurate, stannous octoate and ferric octoate.

In general, these silanol-containing organopolysiloxanes contain an average of from about 1.0 to 1.98 organic groups attached to silicone through silicone-carbon linkages, and contain an average of from 0.01 to 1 silicone-bonded hydroxyl groups per silicone atom. Alternatively, some of the silicone-bonded hydroxyl groups can be replaced with alkoxy groups or with pendant hydrogen atoms.

These compositions can be described as having the average formula (1) $(R)_a(HO)_b(R'O)_cSiO$ where R is a monovalent hydrocarbon radical or a substituted monovalent hydrocarbon radical, R' is an alkyl radical containing from 1 to 8 carbon atoms, a. has a value of from 1.0 to 0.98, $b$ has a value from 0.01 to 1, $c$ has a value of from 0 to 0.99, the sum of $b+c$ is from 0.01 to 1, and the sum of $a+b+c$ is from 1.01 to 2.1. Included among the radicals represented by R are, for example, alkyl radicals, e.g., methyl, ethyl, propyl, butyl, octyl, decyl, etc. radicals; aryl radicals, e.g., phenyl naphthyl, xylyl, tolyl, etc. radicals; aralkyl radicals, e.g., benzyl, phenyl-ethyl, styryl, etc. radicals; alkenyl radicals, e.g., vinyl, allyl, etc., radicals; cycloaliphatic hydrocarbon radicals, e.g., cyclohexyl, cycloheptyl, cyclohexenyl, etc. radicals; cyanoalkyl radicals, e.g., cyanoethyl, cyanomethyl, cyanopropyl, etc., radicals; halogenated monovalent hydrocarbon radicals, e.g., chloromethyl, bromomethyl, chloroethyl, chlorophenyl, tetrachlorophenyl and dibromophenyl radicals.

Representative of the millable silicone rubber gums are those described as: organo-substituted polysiloxanes, commonly called dialkyl or alkyl-aryl polysiloxane gums. The substituted groups are usually at least 50 percent in number methyl groups. The remainder of the groups are usually methyl or methyl with 5 to 20 percent phenyl or methyl with phenyl and vinyl, or methyl, vinyl or cyanopropyl groups, methyl vinyl and ethyl groups, or methyl and trifluoropropyl groups. The millable silicone rubber gums can be shown by the empirical formula

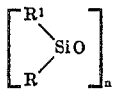

where R and R' are selected from the class consisting of the methyl and ethyl groups, the halogen and nitrile substituted alkyl groups containing from 1 to 4 carbon atoms, phenyl, halogenated phenyl, vinyl and cyclohexenyl groups and n is a large number. R and R' may, if desired, be predominately or entirely methyl groups.

The millable gum silicone rubbers are generally cured by reacting the poly(organosiloxane) with a peroxide such as 2,4-dichlorobenzoyl peroxide, di-(tertiarybutyl)perbenzoate, tertiarybutyl perbenzoate, benzoyl peroxide or dicumyl peroxide. Usually about from 0.5 to 15 and preferably 1.0 to 3.0 parts of curing agent per 100 parts by eight of silicone rubber are used, depending on the percentage of unsaturated substitution present.

Various fillers can be added to the silicone rubber before curing, typical of which are, for example. fume silicas, silica aerojels, organo-silane modified silicas, barium and cadmium titanates, zirconates and stannates; diatomaceous earth, clays, calcium carbonate, finely ground quarts, barites, iron oxide, zinc oxide, titanium dioxide and mixtures thereof.

The cured silicone rubbers have various physical properties. For example, they may have tensile strengths from about 100 to about 1,000 pounds per square inch, elongations of from about 100 to 600 percent and a Durometer hardness, Shore A scale of from about 20 to about 60.

It has been found that if the substrate surface having the deposit thereon is a silicone rubber, it is preferred that the organic acids are concentrated so that they will wet and penetrate the silicone rubber surface. Preferably they contain less than about 5 weight percent of water based on the acid.

When molded polyurethane articles are prepared by applying a polyurethane reaction mixture containing at least one of the substituted methyl amine compounds to a substrate mold surface in the presence of atmospheric water and carbon dioxide, curing the reaction mixture and removing the molded polyurethane article from the mold, the harmful deposits can progressively form and build up on the substrate surface and adhere to successive molded articles. Diamines having amine groups attached to nonbenzenoid carbon atoms are used as curatives or chain extenders for polyurethanes and therefore are used to form polyurethane reaction mixtures.

Thus, in the practice of this invention, a method of retarding and removing deposits from substrate mold surfaces, where the said deposits are formed by contacting the substrate surface in the presence of water and carbon dioxide with the polyurethane reaction mixture, curing the reaction mixture, and removing the resulting cured polyurethane article from the substrate surface, comprises contacting the substrate surface with a mixture of the liquid chloro-substituted olefin and polyurethane reaction mixture and subsequently treating the said substrate surface and any deposits with an acid selected from the group consisting of formic acid, acetic acid, and propionic acid. Such deposits can be retarded or removed from the pores of a permeable mold substrate surface such as a silicone rubber by successively treating the surface and any deposits with successively lower acids selected from the group consisting of formic acid, acetic acid, and propionic acid, and drying the substrate surface.

The polyurethane reaction mixtures which can be used in the practice of this invention to prepare mold substrate surfaces and to prepare molded articles on substrate surfaces are prepared from reactive hydrogen-containing polymeric materials, an organic polyisocyanate and at least one of the amino compounds such as substituted methyl amines. It is to be understood that the polyurethanes referred to in this specification may also contain polyurea linkages. Usually a solvent is added to the reaction mixture so that it will be in the form of a fluid mixture or solution. Generally, sufficient solvent is added to form a solution containing from about 35 to about 65 by weight of the mixture as a percent solids. However, a higher or lower concentration of solids can be used, depending upon the reactants used and upon the intended use of the solution.

The reactive hydrogen-containing polymeric material used comprises at least one member selected from the group consisting of polyester polyols, polyesteramides, polyether polyols, dihydroxy terminated polymers of conjugated diene hydrocarbons, and castor oil. The reactive hydrogen-containing material generally used has a molecular weight between about 700 and about 5,000 and, usually, between about 1,000 and about 3,000. Generally the polyester polyols are the preferred active hydrogen-containing material where high strength and solvent resistance are desired.

Representative example of polyester polyols are the condensation products of low molecular weight polyols with an organic polycarboxylic acid or anhydride. Representative low molecular weight polyols are glycols such as ethylene glycol, propylene glycol, butylene glycol, pentylene glycol, decamethylene glycol, etc. Representative examples of the organic dicarboxylic acids that can be used are succinic acid, glutaric acid, adipic acid, phthalic acid, terephthalic acid, isophthalic acid, suberic acid, sebacic acid, pimelic acid, and azelaic acid. The anhydrides of such acids can be used in place of the acid. If desired, from about one to 20 percent by weight of a triol or higher polyfunctional polyol or polyfunctional acid can be present to produce branching in the polyurethane polymer.

Polyether polyols useful in preparing the polyurethanes used in this invention can be prepared by polymerizing or copolymerizing alkylene oxides such as ethylene oxide, propylene oxide, and butylene oxides, by polymerizing or copolymerizing the low molecular weight glycols, or by the reaction of one or more such alkylene oxides with the glycols or with triol, or with a polycarboxylic acid such as phthalic acid. The polyether polyols include polyalkylene-aryl ether glycols or triols, polytetramethylene ether glycols, polyalkylene ether-thioether glycols or triols, and alkyd resins. Generally, the polytetramethylene ether glycols are the preferred polyether glycols.

Representative examples of dihydroxy-terminated polymers of conjugated diene hydrocarbons are dihydroxy-terminated polymers of isoprene and butadiene and their copolymers with minor amounts of vinyl compounds such as styrene and acrylonitrile.

Polyesteramides may be prepared by reacting a diamine, a glycol, and a dicarboxylic acid under conditions which will remove the water of condensation. Representative glycols and dicarboxylic acids useful in preparing polyesteramides are those useful in preparing polyesters, examples of which have already been shown. Various diamines may be used in forming the polyesteramides, representative of which are ethylene diamine, hexamethylene diamine, decamethylene diamine, cyclohexyl diamine, phenylene diamine, methylene dianiline, toluidine diamine, dichlorobenzidine, and methylene-bis-chloroaniline.

The organic polyisocyanates used to prepare the polyurethanes include various organic diisocyanates and mixtures thereof. Generally the organic diisocyanates are preferred. The organic polyisocyanates can be aromatic, aliphatic, or cycloaliphatic or combinations of these types.

Representative examples of such polyisocyanates include the toluene diisocyanates, m-phenylene diisocyanate, 4-chloro-1, 3-phenylene diisocyanate, 4,4'-tetramethylene diisocyanate, 1,6-hexamethylene diisocyanate, 1,10-decamethylene diisocyanate, 1,4-cyclohexylene diisocyanate, 4,4'-methylene bis (cyclohexylisocyanate) and 1,5-tetrahydronaphthalene diisocyanate, and mixtures of such diisocyanates. For the purpose of the present invention, the toluene-diisocyanates, diphenylmethane-4,4'-diisocyanate and 3,3'-dimethyl-4,4'-bisphenylene diisocyanate, are generally preferred although the disocyanate having isocyanato groups connected to nonbenzenoid carbon atoms are preferred where color retention is important.

The polyurethane polymers are usually prepared by forming a liquid polyurethane reaction mixture by reacting a reactive hydrogen-containing polymeric material with a polyisocyanate to form an isocyanate terminated polyurethane which is then mixed with the diamine. The reaction mixture is then cured to form the polyurethane polymer. The isocyanate terminated polyurethanes can be prepared by reacting the reactive hydrogen-containing polymeric material with the organic polyisocyanate in proportions such that the ratio of isocyanate groups to the reactive hydrogen-containing groups of the reactive hydrogen-containing polymeric material is from about 1.1/1 to about 12/1 and preferably about 1.2/1 to about 2.5/1. These materials are generally reacted at temperatures from about 20° C. to about 150° C. The reactive hydrogens of the reactive hydrogen-containing polymeric material are supplied by hydroxyl groups and amino groups.

As hereinbefore described, in the practice of this invention suitable solvents for the polyurethanes are the liquid chloro-substituted olefins. Mixtures of the olefins may be used to obtain satisfactory spreading properties and evaporation rates, particularly when the polyurethane is to be used as a spray composition and applied to a suitable surface. As a further benefit, such chlorinated hydrocarbons are essentially non-flammable, thereby facilitating the preparation of polyurethane reaction mixtures which can be used for molding various articles in confined areas. This thereby substantially reduces the danger of a hazardous explosive condition.

The isocyanate-terminated polyurethane, sometimes called a prepolymer, is usually dissolved or dispersed in the solvent to form a solution or dispersion which is then reacted with the diamine to form a cured polyurethane. The diamine is usually added to the isocyanate-terminated polyurethane in a ratio of from about 0.5/1 to about 1.5/1 and, preferably about 0.8/1 to about 1.0/1 amine groups of the diamine for each isocyanate group in excess of the reactive hydrogen groups of the reactive hydrogen-containing polymeric material.

The following illustrative examples are set forth to further exemplify the objects and advantages of the invention. The parts and percentages are by weight unless otherwise indicated.

EXAMPLES I-XII

Liquid polyurethane reaction mixtures were prepared by a prepolymer method with various diamines having amino groups attached to nonbenzenoid carbon atoms, cast onto various substrate surfaces in the presence of atmospheric water and carbon dioxide, cured to form solid polyurethanes, and the solid polyurethanes were released from the substrates. For the purpose of this disclosure these polyurethane castings are referred to as examples I through XII and are shown in Table 1. The substrates used in these examples are those which normally do not tightly adhere to the cured polyurethane. For Examples I through X a silicone rubber substrate was used, in Example XI a natural rubber substrate was used, and in Example XII a cured polyurethane substrate was used. In both of Examples XI and XII, a soya bean fatty acid release agent was coated over the substrate surface.

In example I, 14 successive polyurethane articles, hereinafter also referred to as parts, were molded on the silicone rubber substrate surface. The polyurethane articles were molded on the substrate at a rate of about 10 molded articles per day by applying a liquid polyurethane reaction mixture to the substrate surface and curing the reaction mixture for about 30 minutes at 60° C. At the end of each day the mold substrate was allowed to rest for about 12 hours. At the end of the 3rd day 29 molded articles had been prepared. Each of the molded polyurethane articles had a successively reduced gloss progressively ranging from a gloss of about 3 gloss units for the first molded article to a gloss of about 0.5 gloss units for the 29th molded article. The gloss was determined with a 60° glossmeter according to ASTM Method D523-66T. The silicone rubber mold surface during the successive molding operations became progressively harder and assumed a white discoloration. The molded polyurethane articles became progressively more difficult to release from the silicon rubber substrate. Under microscopic examination after the 29th molded article, the silicone rubber surface was observed to be distorted, swelled, and cracked and to be impregnated with a white crystalline deposit.

The 30th polyurethane molded article was prepared on the substrate the following day. The 30th cured polyurethane article adhered to the substrate with sufficient tenacity to tear the silicone rubber mold substrate upon its removal.

In examples II through IX, the silicone rubber substrate was washed with various organic acids and organic acid-solvent mixtures after about each 15th polyurethane molded article or part was prepared on its surface by the method of example I. As shown in Table 1, the silicone rubber substrate maintained its good release properties but the gloss of the molded polyurethane articles decreased from a gloss of 3 gloss units to a gloss of 0 gloss units.

In example X, after about each 15 parts, the mold was washed with a mixture of glacial acetic acid and chloroform. After about each 75 parts, the mold surface was first washed with the glacial acetic acid mixture followed by washing the mold with formic acid. As shown in Table 1, after 600 parts, the silicone rubber substrate showed excellent release properties as to its ability to release the polyurethane molded articles and the molded polyurethane articles had a gloss of 2.5 gloss units compared to a gloss of 3.0 units for the original casting from the silicone rubber substrate.

For example XI and XII the substrates were washed with a mixture of 50 percent by weight glacial acetic acid in acetone after about each 40 parts. The mold release agent was applied to the substrate surface before each polyurethane article was molded on the silicone rubber substrate.

The flexible silicone rubber molds used for examples I to X were prepared by casting a liquid room temperature vulcanizing silicone rubber over the surface of a shaped leather grained substrate. The silicone rubber was cured at about 25° C. for 8 hours and was easily removed from the leather grained substrate to form a flexible, self-releasing silicone rubber mold having an inner surface, the said inner surface being a negative reproduction of the leather grained surface of the said substrate. The molds of silicone rubber were then further post cured for about 3 days at about 250° C. and for 8 hours at about 60° C. The inner surface of the silicone rubber molds had a gloss of 30 gloss units. The liquid room temperature curing silicone rubber used to prepare the flexible molds was prepared by mixing components A and B of RTV 588, (obtained from The Dow Corning Company), immediately prior to preparing the mold of the silicone rubber. Component A comprised a mixture of a prepolymer, chain extender, stabilizers, oils and fillers. The prepolymer was a silanol terminated polyorganosiloxane, and the chain extender a polyalkoxy substituted polyorganosiloxane. Component B comprised dibutyltin dilaurate catalyst, fillers and oils.

The polyurethane reaction mixtures used for examples I to XII were prepared by mixing a polyurethane prepolymer solution with the diamine solution. The polyurethane prepolymer was prepared according to the following recipe:

| Compound | Parts by Weight |
| --- | --- |
| 1,4-Butane diol adipate having a molecular weight of about 2,000 and an hydroxyl number of about 56 | 27 |
| 1,4-Butane diol adipate having a molecular weight of about 1,000 and a hydroxyl number of about 112 | 27 |
| 4,4'-Dicyclohexyl methane diisocyanate | 21.5 |
| Dichloromethane (solvent) | 50 |
| Lacquer (a vinyl-acrylic copolymer used as a colorant pigment) | 10 |

The 4,4'-dicyclohexyl methane diisocyanate was heated to about 90° C. and mixed with the 1,4 butane diol adipate polymers which had also been preheated to about 90° C. and allowed to react for about 50 minutes at about 150° C. The mixture was then degassed for about 45 minutes at a reduced pressure of about 28 inches of mercury. This prepolymer was then dissolved in the dichloromethane to which the small amount of lacquer had been added.

Just before application to the mold substrate, the polyurethane prepolymer was mixed with about 17 parts of a curative solution which consisted of

| Compound | Parts by Weight |
| --- | --- |
| Diamine | 20 |
| Acetone | 80 |

The natural rubber substrate used in example XI was prepared from the following:

| Compound | Parts by Weight |
| --- | --- |
| Natural rubber latex | 100.0 |
| Potassium Cleate | 2.0 |
| 10 percent Sodium hydroxide | 0.5 |
| Sulfur containing curing agent | 2.0 |
| Zinc oxide | 1.0 |
| Ethyl zimate | 0.5 |

The cured polyurethane substrate used in example XII was prepared from a prepolymer of a polybutadien polyol and 4,4'-methyl-bis-(cyclohexylisocyanate), a 2-ethyl1,3-hexane diol curative, and dibutyl tin dilaurate as a catalyst.

For examples XIV to XXX, the silicone rubber squares were immersed in solutions of various compounds having amino groups attached to nonbenzenoid carbon atoms for about 96 hours at about 30° C. The squares were then dried at about 25° C. for about 48 hours in the atmosphere which contained atmospheric water and carbon dioxide.

When the silicone rubber squares were dry, the appearance of their surfaces was noted in Table 2 and according to the method of example I, a liquid polyurethane reaction mixture was prepared, cast and cured on their surfaces according to the method of example I. In all of the examples XIV to XXX the cured polyurethanes released from the silicone rubber with greater difficulty than from the silicone rubber which had not been treated with the compounds having amino groups. In all of the examples XIV to XXX the treated silicone rubber squares showed visual evidence of a deposit formation.

The silicone rubber squares of examples XIV to XXX were then washed with a solution of 50 weight percent glacial acetic acid and 50 weight percent chloroform and dried.

After the acetic acid wash the liquid polyurethane reaction mixture was cast and cured on the surface of the silicone rubber squares according to the method of EXAMPLE XIII. In all of the examples XIV to XXX, the cured polyurethane layer easily released from the silicone rubber squares.

Table 2

| Example | Amine Compound | Appearance after Treatment with Amine Compound |
| --- | --- | --- |
| XIV | 1,4-cyclohexane bis methylamine | White, crusty, migratory stain |
| XV | 4,4'-diamino dicyclohexyl methane | White, crusty, migratory stain |
| XVI | Menthane diamine | Pink curst, white penetrating stain |
| XVII | Triethylene tetramine | White penetrating stain |
| XVIII | Diethylene triamine | White penetrating stain |
| XIX | Tetraethylene pentamine | White penetrating stain |
| XX | Trimethylhexamethylene diamine | White penetrating stain |
| XXI | Isophorone diamine | White penetrating stain |
| XXII | Diamine A-100 | White penetrating stain |
| XXIII | Ethylene diamine | White penetrating stain |
| XXIV | Cyclobutane-1,2-bis-methylamine | White penetrating stain |
| XXV | Meta xylene diamine | White penetrating stain |
| XXVI | Para xylene diamine | White penetrating stain |
| XXVII | Meta-para xylene diamine | White penetrating stain |
| XXVIII | Tetrachloro paraxylene diamine | White penetrating stain |
| XXIX | Imino-bis propylamine | White penetrating stain |
| XXX | Bis (amino propyl) piperazine | White penetrating stain |

TABLE 1

| Examples | Mold substrate | Diamine | Acid wash | Frequency of wash/parts | Ability to release after number of molded parts |
| --- | --- | --- | --- | --- | --- |
| I | Silicone rubber | Meta-xylene diamine | None | 1/15 | Adhesion/30 parts. |
| II | do | do | Glacial acetic acid | 1/15 | Excellent/500 parts. |
| III | do | do | Glacial acetic plus CHCl₃ (50%) | 1/15 | Do. |
| IV | do | do | 97% formic | 1–15 | Excellent/100 parts. |
| V | do | do | 97% propionic | 1/15 | Do. |
| VI | do | Meta-para xylene diamine | Glacial acetic plus CHCl₃ (50%) | 1/15 | Excellent/600 parts. |
| VII | do | 4,4'-diamino dicyclohexyl methane | do | 1/15 | Excellent/100 parts. |
| VIII | do | Menthane diamine | do | 1/15 | Do. |
| IX | do | Diamine A-100* | do | 1/15 | Excellent/80 parts. |
| X | do | Meta-para xylene diamine | Glacial acetic plus CHCl₃ (50%) and 97% formic acid. | 1/15 1/75 | Excellent/600 parts. |
| XI | Natural rubber latex | do | Glacial acetic and acetone | 1/40 | Excellent/300 parts. |
| XII | Polyurethane | do | do | 1/40 | Do. |

*A long chain fatty acid diamine obtained from General Mills, Inc.

EXAMPLES XIII–XXX

To illustrate deposit formation by various substituted methyl amines in the presence of water and carbon dioxide in examples XIII to XXX small 1 inch by 1 inch squares of silicone rubber were prepared by casting and curing a liquid room temperature vulcanizing silicone rubber prepared according to the method used in examples I to XII.

For example XIII, a liquid polyurethane reaction mixture was prepared, cast and cured on the surface of a silicone rubber square. The polyurethane reaction mixture was cured at about 25° C. for about 12 hours. The layer of cured polyurethane did not tightly adhere to the surface of the silicone rubber square and was easily released and removed from the said silicone rubber surface.

EXAMPLES XXX–XXXIX

Squares of silicone rubber were prepared according to the method of example XIII and immersed in a solution of meta-paraxylene diamine at about 30° C. for about 96 hours. The squares were then dried at about 25° C. for about 48 hours in the presence of atmospheric water and carbon dioxide.

When the silicone rubber squares were dry, their surfaces were dull and had a white crusty appearance. When a polyurethane reaction mixture was cast and cured on the surface of one of the silicone rubber squares according to the method of example XIII the resulting cured polyurethane released from the silicone rubber with difficulty.

The modified silicone rubber squares were washed with various organic acids as shown in Table 3, and dried after the acid wash. A polyurethane reaction mixture was cast and cured on the surfaces of the silicone rubber squares according to the method of example XIII. In all of the examples XXXI to XXXIX, the cured polyurethane easily released from the silicone rubber squares.

In examples XXXVII, XXXVIII, and XXXIX, the modified silicone rubber squares had been successively washed with successively lower acids. In these three examples not only were the release properties of the silicone rubber squares rejuvenated but their original gloss was substantially restored or substantially improved. Except for example XXXIV where the dilute acid wash did not rejuvenate the silicone rubber surface, in examples XXXI to XXXVI the release property of the silicone rubber squares was rejuvenated but their surfaces remained dull.

TABLE 3

| Example | Amine Compound | Acid Wash |
|---|---|---|
| XXXI | Meta-Para xylene diamine | Glacial Acetic Acid |
| XXXII | Meta-Para xylene diamine | Glacial Acetic 50% in CHCL₃ |
| XXXIII | Meta-Para xylene diamine | Glacial Acetic 50% in MEOH |
| XXXIV | Meta-Para xylene diamine | Glacial Acetic |
| XXXV | Meta-Para xylene diamine | 97% Propionic |
| XXXVI | Meta-Para xylene diamine 97% Formic | |
| XXXVII | Meta-Para xylene diamine | Glacial Acetic, then 197% Formic |
| XXXVIII | Meta-Para xylene diamine | 97% Propionic, then Glacial Acetic |
| XXXIX | Meta-Para xylene diamine | 97% Propionic, then 97% Formic |

EXAMPLE XXXI

Successive polyurethane parts were molded on a silicone rubber surface according to the method of example I, except that toluene was used for the solvent of the polyurethane reaction mixture instead of methylene chloride. The silicone rubber had a Shore A hardness of 45. After about 60–80 parts had been molded in a mold, the mold surface exhibited a cracking or hazing appearance much like large cracks in mud as it dries. The Shore A hardness of the silicone rubber had increased to 50. After about 200 parts the mold surface exhibited blisters and began to chunk and tear apart.

Correspondingly, successive molded parts were molded on the silicone substrate surface except that methylene chloride was used for the solvent of the polyurethane reaction mixture instead of toluene. After 180 parts had been molded in the silicone mold, the mold surface had not even started to crack. The hardness of the silicone rubber remained about the same.

For the purpose of this example the polyurethane reaction mixture was prepared by melting 100 parts of the adipates and degassing at about 80° C. for 1 hour under a reduced pressure. The diisocyanate in the amount of 40 parts was also melted and the adipate and diisocyanate mixed and allowed to react for about 1 hour at about 100 to 120° C. The mixture was then degassed for 1 hour at about 100° C. under a reduced pressure and then allowed to cool to 68–74° C. The degassed mixture was then dissolved in 140 parts of methylene chloride.

A curative solution was prepared by mixing 20 parts of meta-para-xylene diamine with 80 parts of methyl ethyl ketone.

Just before application to the mold surface, 100 parts of the polyurethane prepolymer were mixed with about 16 parts of the curative solution plus 10 parts of pigment. Upon casting of the mold substrate it was placed in an Infrared heated oven at a temperature of about 100° C. for about 3–5 minutes, then removed from the oven and the molded polyurethane article removed from the silicone rubber mold The silicone rubber mold was prepared according to the method used in example I except that it was not further post cured for about 3 days at about 250° C. and for 8 hours at about 60° C. The liquid room temperature curing silicone rubber was used was prepared by mixing components A and B of Silastic E, (obtained from the Dow Corning Company). Component B comprised a platinum catalyst, fillers and oils.

While certain representative embodiments and details have been shown for the purpose of illustrating the invention, it will be apparent to those skilled in this art that various changes and modifications may be made therein without departing from the spirit or scope of the invention.

What is claimed is:

1. A method of retarding the fouling of a substrate surface and resulting deposits thereon, where the said fouling is caused by contacting it in the presence of water and carbon dioxide with at least one amine compound selected from compounds having primary amino groups and compounds having secondary amino groups, where the said amine compounds are identified by the test which comprises forming 1 liter of a solution containing from about 10 to about 20 parts by weight of the amine compound per 100 parts by weight of methyl ethyl ketone, aging the solution for 8 hours at 25° C., warming the solution to 40° C. and passing gaseous carbon dioxide at about 25° C. through the solution at a rate of about 1 gaseous liter per minute to form a turbidity in the solution within 60 minutes, the method being characterized by treating the substrate with a mixture of a liquid chloro-substituted olefin and the amine compound and subsequently treating the substrate with an organic acid selection from at least one of the group consisting of formic acid, acetic acid, and propionic acid.

2. A method according to claim 1 wherein the amine compound is a substituted methyl amine compound selected from the group consisting of a compound having the structure (1) 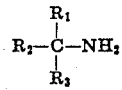

and a compound prepared by reacting a substituted methyl amine compound (1) with a compound selected from the group consisting of an aldehyde and a ketone, where $R_1$, $R_2$ and $R_3$ are individually selected from the group consisting of (a) hydrogen radicals, alkyl, cycloalkyl, aryl, alkaryl, and aralkyl radicals, and (b) substituted alkyl, cycloalkyl, aryl, alkaryl, and aralkyl radicals where the substituents are selected from at least one of the group consisting of hydrogen, carbon, oxygen, sulfur, fluorine, chlorine, bromine, iodine, and phosphorous.

3. A method according to claim 1 where the substituted methyl amine compound is a diamine having amino groups attached to nonbenzenoid carbon atoms.

4. A method according to claim 1 where the substituted methyl amine compound is selected from the group consisting of ethylene diamine, hexamethylene diamine and dimethyl hexamethylene diamine; isophorone diamine, 1,4-cyclohexane bis methylamine, 4,4'-diamino-dicyclohexyl methane, meta xylene diamine, paraxylene diamine, tetrachloroparaxylene diamine, cyclobutane-1,2 bis methylamine, methane diamine, imino bis propylamine, bis (amino propyl) piperazine, diethylene triamine, triethylene tetramine, and tetraethylene pentamine.

5. A method according to claim 6 where the solid substrate surface is selected from at least one of the group consisting of polyethylene, polypropylene, silicone rubber, and release agent coated metals, cured millable gum silicone rubber, cured natural rubber, rubberlike polymers, thermoplastic polymeric materials, and thermoset polymeric materials.

6. A method according to claim 7 where the substrate surface is a silicone rubber, and where the organic acid is concentrated.

7. A method according to claim 1 where the said deposit is formed in the pores of a substrate surface which comprises successively treated the deposit with successively lower organic acids selected from the group consisting of formic acid, acetic acid, propionic acid, and drying the said substrate surface.

8. A method according to claim 1 where the organic acid is mixed with an inert solvent.

9. A method according to claim 1 where the deposit is formed by contacting the substrate surface in the presence of water and carbon dioxide with a polyurethane reaction mixture, curing the reaction mixture, and removing the resulting cured polyurethane article from the substrate surface, where the polyurethane reaction mixture contains at least one of the substituted methyl amine compounds.

10. A method according to claim 9 where the deposit is removed from the substrate surface and where the substituted methyl amine compound is selected from at least one of the group consisting of ethylene diamine, hexamethylene diamine and dimethyl hexamethylene diamine; isophorone diamine, 1,4-cyclohexane bis methyl amine, 4,4'-diamino-dicyclohexyl methane, meta xylene diamine, para-xylene diamine, tetrachloroparaxylene diamine, cyclobutane-1,2 bis methylamine, menthane diamine, imino bis propylamine, bis (amino propyl) piperazine, diethylene triamine, triethylene tetramine, and tetraethylene pentamine.

11. A method according to claim 10 where the solid substrate surface is selected form at least one of the group consisting of polyethylene, polypropylene, silicone rubber, and release agent coated metals, cured millable gum silicone rubbers, cured natural rubber, rubberlike polymers, thermoplastic polymeric materials, and thermoset polymeric materials.

12. A method according to claim 11 where the substrate surface is a silicone rubber, where the organic acid is concentrated and where the said polyurethane reaction mixture is prepared from (a) at least one reactive hydrogen-containing polymeric material having a molecular weight between about 700 and about 5,000 selected from the group consisting of polyester polyols, polyester amides, polyether polyols, dihydroxyl-terminated polymers of conjugated diene hydrocarbons, and castor oil, (b) at least one organic polyisocyanate, the overall molar ratio of the isocyanate groups of the polyisocyanate to the reactive hydrogens of the hydrogen-containing polymeric material being between about 1.1/1 and about 12/1, and (c) at least one diamine having amino groups attached to nonbenzenoid carbon atoms in a ratio of from about 0.5/1 to about 1.5/1 of amine groups to the isocyanate groups in excess of the reactive hydrogen-containing polymeric material.

PO-1050
(5/69)

UNITED STATES PATENT OFFICE
CERTIFICATE OF CORRECTION

Patent No. 3,607,397      Dated September 21, 1971

Inventor(s) Larry H Watters

It is certified that error appears in the above-identified patent and that said Letters Patent are hereby corrected as shown below:

Column 1, line 62, "with" should read -- within --.

Column 4, line 56, the formula "$(R)_a(HO)_b(R'O)_cSiO$" should read -- $(R)_a(HO)_b(R'O)_cSiO_{\frac{4-a-b}{2}}$ --.

Column 4, line 59, "0.98" should read -- 1.98 --.

Column 5, line 26, "eight" should read -- weight --.

Column 7, line 8, "disocyanate" should read -- diisocyanate --.

Column 7, lines 47 and 48, delete "of the reactive hydrogen groups".

Column 8, line 9, delete "about".

Column 8, line 17, "silicon" should read -- silicone --.

Column 9, line 44, "polybutadien" should read -- polybutadiene --.

Columns 9 and 10, Table 1, Example V, "1-15" should read -- 1/15 --.

Column 10, Table 2, Example XVI, "curst" should read -- crust --.

Column 11, Table 3, Example XXXIV, after "Glacial Acetic" add -- 3% in $H_2O$ --.

UNITED STATES PATENT OFFICE
CERTIFICATE OF CORRECTION

Patent No. 3,607,397　　　　　　　　Dated September 21, 1971

Inventor(s) Larry H Watters　　　　　　PAGE- 2

It is certified that error appears in the above-identified patent and that said Letters Patent are hereby corrected as shown below:

Column 12, line 64, claim 5, "6" should read -- 4 --.

Column 12, line 70, claim 6, "7" should read -- 5 --.

Column 12, line 75, claim 7, "treated" should read -- treating --.

Column 14, line 15, claim 12, "polymers" should read -- polymer --.

Signed and sealed this 30th day of May 1972.

(SEAL)
Attest:

EDWARD M. FLETCHER, JR.
Attesting Officer

ROBERT GOTTSCHALK
Commissioner of Patents